United States Patent [19]
Wilhoit et al.

[11] Patent Number: 5,928,740
[45] Date of Patent: Jul. 27, 1999

[54] THERMOPLASTIC $C_2$-α-OLEFIN COPOLYMER BLENDS AND FILMS

[75] Inventors: Darrel Loel Wilhoit, Plainfield; Paul Nick Georgelos, Naperville, both of Ill.

[73] Assignee: Viskase Corporation, Chicago, Ill.

[21] Appl. No.: 08/808,093

[22] Filed: Feb. 28, 1997

[51] Int. Cl.⁶ .................... B32B 27/08; C08L 23/08
[52] U.S. Cl. .................. 428/34.9; 428/35.2; 428/35.4; 428/35.5; 428/212; 428/220; 428/515; 428/516; 428/518; 428/520; 525/240
[58] Field of Search ..................... 428/34.9, 35.2, 428/35.4, 35.5, 212, 220, 515, 516, 517, 518, 519, 520, 521, 522, 523, 910; 525/240

[56] References Cited

U.S. PATENT DOCUMENTS

| | | | |
|---|---|---|---|
| 3,456,044 | 7/1969 | Pahlke | 264/25 |
| 4,064,296 | 12/1977 | Bornstein | 428/35 |
| 4,178,401 | 12/1979 | Weinberg | 428/35 |
| 4,188,350 | 2/1980 | Vicik et al. | 525/232 |
| 4,196,240 | 4/1980 | Lustig et al. | 428/35 |
| 4,207,363 | 6/1980 | Lustig et al. | 428/35 |
| 4,247,584 | 1/1981 | Widiger et al. | 428/35 |
| 4,357,376 | 11/1982 | Nattinger | 428/35 |
| 4,447,480 | 5/1984 | Lustig et al. | 428/35 |
| 4,737,391 | 4/1988 | Lustig | 428/35 |
| 4,863,769 | 9/1989 | Lustig et al. | 428/34.9 |
| 4,863,784 | 9/1989 | Lustig et al. | 428/218 |
| 4,865,780 | 9/1989 | Lustig et al. | 264/22 |
| 4,892,603 | 1/1990 | Lustig et al. | 156/44 |
| 4,988,465 | 1/1991 | Lustig et al. | 264/22 |
| 5,032,463 | 7/1991 | Smith | 428/520 |
| 5,055,328 | 10/1991 | Evert | 428/34.9 |
| 5,059,481 | 10/1991 | Lustig et al. | 428/39.9 |
| 5,272,016 | 12/1993 | Ralph | 428/516 |
| 5,279,872 | 1/1994 | Ralph | 428/34.9 |
| 5,283,128 | 2/1994 | Wilhoit | 428/516 |
| 5,376,439 | 12/1994 | Hodgson et al. | 428/220 |
| 5,397,613 | 3/1995 | Georgelos | 428/36.7 |
| 5,397,640 | 3/1995 | Georgelos et al. | 428/349 |
| 5,403,668 | 4/1995 | Wilhoit | 428/500 |
| 5,434,010 | 7/1995 | Smith et al. | 428/520 |
| 5,460,861 | 10/1995 | Vicik et al. | 428/34.9 |
| 5,491,019 | 2/1996 | Kuo | 428/213 |
| 5,562,958 | 10/1996 | Walton et al. | 428/34.9 |
| 5,593,747 | 1/1997 | Georgelos | 428/36.7 |
| 5,604,043 | 2/1997 | Ahlgren | 428/518 |
| 5,635,261 | 6/1997 | Georgelos et al. | 428/35.4 |
| 5,755,081 | 5/1998 | Rivett et al. | 53/477 |
| 5,759,648 | 6/1998 | Idlas | 428/34.9 |

FOREIGN PATENT DOCUMENTS

| | | | |
|---|---|---|---|
| 2085813 | 6/1994 | Canada | B32B 27/08 |
| 468 284 B1 | 1/1992 | European Pat. Off. | A22C 13/00 |
| 597 502 A1 | 5/1994 | European Pat. Off. | C08L 23/04 |
| 600 425 A1 | 8/1994 | European Pat. Off. | B32B 27/32 |
| 701 897 A2 | 3/1996 | European Pat. Off. | B32B 27/08 |
| WO95/33621 | 12/1995 | WIPO | B32B 27/08 |

OTHER PUBLICATIONS

*Plastic World*, 1995 pp. 33–36.

Primary Examiner—Rena L. Dye
Attorney, Agent, or Firm—Cedric M. Richeson

[57] ABSTRACT

A polymer blend and mono-and multilayer films made therefrom having improved properties such as heat sealing or puncture resistance wherein the blend has a first polymer of ethylene and at least one α-olefin having a polymer melting point between 55 to 75° C.; a second polymer of ethylene and at least one α-olefin having a polymer melting point between 85 to 110° C. and a third thermoplastic polymer having a melting point between 115 to 130° C.; and optionally a fourth polymer e.g. EVA, having a melting point between 90 to 100° C.

17 Claims, No Drawings

THERMOPLASTIC $C_2$-$\alpha$-OLEFIN COPOLYMER BLENDS AND FILMS

BACKGROUND OF THE INVENTION

The invention relates to thermoplastic $C_2$-$\alpha$-olefin copolymer resin blends and flexible films thereof having heat sealing and puncture resistance properties. Such blends are useful for making films particularly heat shrinkable, oriented films for packaging food and non-food articles, but especially fresh or frozen foods such as meat, poultry or cheese.

Manufacturers and wholesalers utilize flexible thermoplastic packaging films to provide economical, sanitary containers which help protect and/or preserve the freshness and wholesomeness of their products. These films are often sold in bag form. For example, a single or multilayer thermoplastic film may be made into bags by a packaging manufacturer using film stock comprising a tubular film or one or more flat sheets or webs of film by well known processes involving e.g. cutting, folding and/or sealing the film to form bags which may then be shipped to processors for use in packaging operations. These films and bags may be printed with customer logos, product data or other information and may also be uniaxially or biaxially oriented, heat shrinkable, or irradiated, or may contain film layers which are abuse resistant or puncture resistant, or which are crosslinked or which enhance or retard or prevent transmission of light, gases, or liquids therethrough. Frequently, multilayer films having one or more barrier layers to oxygen and/or moisture such as saran (a polyvinylidene chloride copolymer), a modified saran e.g. containing methyl acrylate polymer units, ethylene vinyl alcohol copolymer, nylon, or acrylonitrile may be used with a heat sealing layer such as a copolymer of ethylene and vinyl acetate (EVA) to produce bags for packaging oxygen and/or moisture sensitive foods e.g. fresh red meat. Such bags help preserve meat in its original condition by preventing or reducing moisture loss and chemical changes in the meat structure due to oxidation reactions. A typical packaging bag produced from a tubular film stock will have one or two sides which have been heat sealed by the bag manufacturer in the bag forming process. For food packaging bags often will have one open side to allow a food processor to insert ham, turkey, chicken, cheese, primal or subprimal meat cuts, ground beef, fruits, vegetables, bread or other food products into the bag. The food processor then makes a final seal thereby enclosing the bag. This final seal may follow gas evacuation of the bag by vacuum means or replacement of the gaseous environment within the bag by a particular gas or mixture of gases which may be inert or reactive with the enclosed product to provide some advantage such as to assist product preservation. This final seal is frequently a heat seal similar to the initial seals produced by the bag manufacturer although the actual heat sealing equipment may vary.

Thus, commercially available bags are made by transversely sealing a tubular stock of either monolayer or multilayer film and cutting off the tube portion containing the sealed end, or by making two spaced apart transverse seals on a tubular stock and cutting open the side of the tube, or by superimposing flat sheets of film and sealing on three sides, or by end folding flat sheets and sealing two sides.

Generally heat sealing of thermoplastic film is accomplished by applying sufficient heat and pressure to adjacent film layer surfaces for a sufficient time to cause a fusion bond between the layers.

A common type of seal used in manufacturing bags is known to those skilled in the art as a hot bar seal. In making a hot bar seal, adjacent thermoplastic layers are held together by opposing bars of which at least one is heated to cause the adjacent thermoplastic layers to fusion bond by application of heat and pressure across the area to be sealed. For example, bags may be manufactured from a tube stock by making one hot bar seal transverse to the tube. This seal may also be referred to as a bottom seal. Once the bottom seal is applied, the tube stock may be transversely cut to form the mouth of the bag.

The strength of seals of heat shrinkable bags may be measured by determining the time for a seal to fail when under certain conditions the seal is immersed in hot water e.g. at 95° C. i.e., the hot water seal strength ("HWSS") may be measured by a test such as that described as the "restrained shrinkage-seal strength test" in Funderburk et al U.S. Pat. No. 3,900,635 which patent is hereby incorporated by reference.

Once a product such as meat or poultry is inserted into the bag, the package is typically evacuated and the bag mouth sealed. At one time, the standard method for sealing a bag was to fasten a clip around the mouth of the bag. However, heat sealing techniques are now also commonly employed to produce the final closure of the bag. For example, a bag mouth may be hot bar sealed or it may be sealed by another common type of heat seal known as an impulse seal. An impulse seal is made by application of heat and pressure using opposing bars similar to the hot bar seal except that at least one of these bars has a covered wire or ribbon through which electric current is passed for a very brief time period (hence the name "impulse") to cause the adjacent film layers to fusion bond. Following the impulse of heat the bars are cooled (e.g. by circulating coolant) while continuing to hold the bag inner surfaces together to achieve adequate sealing strength.

Generally, impulse seals may be made faster than hot bar seals because of the quick cool down of the impulse ribbon following the heat impulse. Impulse seals are also generally narrower than hot bar seals which lead to an improved package appearance, but narrower seals also leave less margin for error in the production of continuous sealed edges. Since typically less area is bonded in an impulse seal relative to a hot bar seal, the performance of the sealing layer of the thermoplastic film is more critical.

One problem which occurs during impulse heat sealing of known films is that the film in the seal area often becomes extruded during sealing. This results in thinning of the film in the seal area and therefore reduces the strength of the film at the seal or in extreme situations, allows the thinned film to be too easily severed or pulled apart. Those skilled in the art refer to severely extruded seals as "burn through" seals. Thus, a "burn through" seal does not have adequate strength or integrity to seal in or protect the packaged product. One attempt to solve this "burn through" problem is to irradiate the film prior to manufacture of the bag.

Irradiation of a multilayer film made from cross-linkable polymer resins causes the various irradiated resin layers in the film to crosslink. Under controlled conditions, crosslinking by irradiation raises and may also broaden the temperature range for heat sealing, and depending upon the film composition may also enhance puncture resistance of the film. If the heat sealing layer of the thermoplastic film is crosslinked too heavily, the highly crosslinked layer is more difficult to melt or fusion bond which makes it difficult to achieve strong seals, particularly by impulse sealing the bag mouths after filling with meat or poultry. All of the bag seals (including those made by both the bag manufacturers and the food processor and by whatever means including either or both hot bar seals and impulse seals must maintain their integrity to preserve and protect the enclosed food product.

There must be a strong continuous seal to prevent unwanted egress and ingress of gaseous, liquid or solid materials between the bag exterior and interior. This is particularly necessary when the package is made of heat shrinkable film and is to be immersed in hot water to shrink the film against the packaged article since such shrinkage increases the stress on these seals. Thus, there is a continuing need for monolayer and multilayer films which can be made into bags having strong seals especially when formed by hot bar sealing or impulse sealing. Such films should provide strong seals able to withstand a range of temperatures and also be able to produce such seals over a wide sealing temperature range without burn through.

Variations in sealing temperatures, times and pressure are known to exist not only from one brand and/or type of sealers to another but also between different sealing machines sold by the same manufacturer under the same brand identification. Such variations, which may be due to factors such as variation in the manufacturer's product or varying equipment settings or installation, increase the desirability for films which may be heat sealed to produce strong integral seals over a wide range of temperatures and therefore be usefully sealed on different sealing machines.

Another problem encountered during heat sealing is that of inadvertent folding. Normally, a heat seal is made by applying heat and pressure across two sheets or portions of film e.g. the two opposing sides of a flattened tube, however, occasionally the area to be sealed will be inadvertently folded to produce a section of film having four or six sheets or film portions which are pressed between the opposing sealer bars. In such situations it is desirable to be able to seal the film without burn through. A wider impulse heat sealing temperature range is indicative of a greater latitude in sealing through folds than a narrower range.

Copolymers of ethylene and vinyl esters such as vinyl acetate have previously been disclosed as useful materials in monolayer and multilayer thermoplastic films and are known for providing heat sealing properties.

For example, U.S. patent application Ser. No. 07/419,061 (Georgelos et al) filed Oct. 10, 1989, which application is hereby incorporated by reference, disclose EVA blends useful for their heat sealing properties.

U.S. Pat. No. 4,064,296 (Bornstein et al) discloses a heat shrinkable multilayer film having an oxygen barrier core layer of hydrolyzed ethylene-vinyl acetate (EVOH) and outer layers of EVA.

U.S. Pat. No. 4,178,401 (Weinberg et al) discloses an oriented, heat shrinkable packaging film having a blended self-welding layer said to have superior seal strength and abuse resistance. Blends of EVAs with different melt flows are disclosed with e.g. a first EVA having a melt flow of less than 5.0 blended with a second EVA having a melt flow of at least 28. The film may also be crosslinked by irradiation.

U.S. Pat. No. 4,247,584 (Widiger et al) discloses heat sealable food bags made from multilayer films having a heat sealing layer comprising a blend of EVAs with 10 to 90 weight percent of the blend comprising a first EVA having 2–12% VA and a melt index of 0.2 to 10 dg/min. and 90 to 10 weight percent of the blend comprising a second EVA having 8–30% VA and a melt index of 0.2 to 5.

An example of a typical fresh red meat bag currently in commerce is a film having three layers which are coextruded and oriented. The core or middle layer of the film is an oxygen and moisture barrier material, the outer layer provides abrasion resistance and is formulated to provide support for the film during the expansion of the primary tube for orientation, and the inner layer provides heat seal properties and contributes to puncture resistance.

The core or barrier layer of this film is a relatively small percentage of total film thickness and is made of polyvinylidene chloride (PVDC) or vinylidene chloride methylacrylate copolymer (VDC-MA or MA-Saran).

The outer layer of this film is thicker than the core layer and is a blend of very low density polyethylene (VLDPE) and ethylene vinyl acetate (EVA). VLDPE, also called ultra low density polyethylene is a class of ethylene-alpha olefin copolymers having a density which generally is recognized to range from less than 0.915 g/cm$^3$ down to about 0.860 g/cm$^3$. The EVA and VLDPE components contribute to the shrink properties of the film and the VLDPE component contributes to the abrasion and puncture resistance. The VLDPE also adds plastic orientation strength to minimize breaks of the secondary bubble during expansion of the softened primary tube.

By far, the thickest film layer is the inner or heat seal layer. In the commercial film noted above, this layer is over 60% of the total film thickness and comprises a blend of VLDPE and EVA. The heat seal layer provides a significant contribution to the puncture resistance properties of the film. Another desirable film characteristic provided by this layer is the heat seal temperature range. It is preferred that the temperature range for heat sealing the film be as broad as possible. This allows variation in the operation of the heat sealing equipment as opposed to a film having a very narrow heat sealing range. For example, it is desirable for a suitable film to heat seal over a temperature range of 350° F. to 550° F., providing a heat sealing window of 200° F.

While films of the general structure and composition as described above have been in commercial use for many years, efforts continue to improve upon such films and in particular to increase puncture resistance while maintaining ease of processability, a broad heat seal temperature range and a high degree of both machine direction (MD) and transverse direction (TD) shrink.

Recent developments for improving properties of a heat shrinkable film include U.S. Pat. No. 5,272,016 (Ralph). The '016 Patent improves properties of a multilayer nonoxygen barrier film by forming the outer layers of a blend of EVA, VLDPE and a plastomer.

U.S. Pat. No. 5,397,640 discloses a multilayer oxygen barrier film wherein at least one outer film layer is a three component blend of VLDPE, EVA and a plastomer.

U.S. Pat. No. 5,403,668 discloses a multilayer heat shrinkable oxygen barrier film wherein one of the film outer layer is a four component blend of VLDPE, LLDPE, EVA and plastomer.

Recent manufacturing changes in catalysts and processes have provided increasing numbers of polymeric resins having different melting characteristics and melting points, and narrower molecular weight distribution ratios (MWD). MWD is the ratio of $M_w/M_n$, where $M_w$ is the weight-average molecular weight of the resin and $M_n$ is the number-average molecular weight. For example, older commercialized VLDPE resins have a MWD generally in the range of about 3.5 to 8.0, although some VLDPE resins outside this range have been commercialized. Improvements in catalysis technology has been able to produce many resins which reduce this ratio generally to below 3 to the range of about 1.5 to about 2.5 and most typically to about 2.0. This reduction in the MWD means that the polymer chains of these VLDPE resins are more uniform in length. Whereas those having a higher MWD may be said to comprise polymer chains of more varied lengths. Other differences in resin properties have been attributed to differences in distribution along an ethylene backbone resulting in materials produced from single-site catalysts having a lower melting point than a multisite catalyst produced VLDPE of comparable density and melt index. Also, in the case of the above-noted commercial film wherein the heat seal layer is primarily a blend of EVA and VLDPE, it was found that using a more narrow $\overline{M}_w/\overline{M}_n$ VLDPE having a lower melting point in place of a broader $\overline{M}_w/\overline{M}_n$ VLDPE having a higher melting point considerably decreased the operable heat sealing range. For example, where the sealing layer used only a very narrow $\overline{M}_w/\overline{M}_n$, lower melting point VLDPE in the blend, the heat seal temperature was in the order of 400° F. to about 475° F. giving a sealing window of only 75° F.

Past attempts at providing improved heat sealing in films, while making some progress, leave much to be desired. Variability in heat sealing equipment and process parameters continue to produce bags with weak seals which are subject to burn through, which fail to seal through folds, and which produce leaking bags having discontinuous seals. It would be highly desirable to have biaxially stretched, heat shrinkable films and bags whose heat sealing layer in particular and film construction in general allows greater flexibility and variability in heat sealing process parameters while producing strong, integral, continuous seals rapidly and with a lower failure rate relative to prior art films and bags.

Accordingly, one object of the present invention is to provide a novel polymeric blend having improved heat sealing properties.

Another object of the invention is to provide a polymer blend having an improved combination of properties.

Another object of the invention is to provide a flexible film having improved heat sealing properties.

Another object of the present invention is to provide a heat shrinkable biaxially oriented monolayer film having improved puncture resistance and/or a broad heat sealing range.

Another object of the invention is to provide a heat shrinkable biaxially oriented multilayer film having a broad heat sealing range.

Another object of the invention is to provide a heat shrinkable biaxially oriented multilayer film having improved puncture resistance.

Another object of the present invention is to provide a heat shrinkable biaxially oriented multilayer film having an improved combination of puncture resistance and a broad heat sealing range.

Yet another object of the present invention is to provide a heat shrinkable, biaxially oriented multialyer film having a puncture resistance and heat sealing range suitable for use in the packaging of fresh bone-in meats.

A still further object of the present invention is to provide a heat shrinkable, biaxially oriented multilayer film having an improved combination of optical properties, heat sealing properties and puncture and abrasion resistance.

SUMMARY OF THE INVENTION

According to the present invention, a novel polymeric blend, film, and biaxially stretched, heat sealable, heat shrinkable, thermoplastic flexible film comprising at least one heat sealable layer and suitable for use in making bags for packaging e.g. food articles such as primal and subprimal meat cuts is provided. The novel blend is suitable to being formed into a wide variety of articles including packaging films useful for packaging food and nonfood items alike. The inventive polymer blend in its various embodiments has excellent heat sealing properties, optical properties, puncture and abrasion resistance, heat shrinkability, flexibility as well as good combinations of such properties.

The inventive blend has a first polymer of ethylene and at least one α-olefin having a polymer melting point between 55 to 75° C.; a second polymer of ethylene and at least one α-olefin having a polymer melting point between 85 to 110° C. and a third thermoplastic polymer having a melting point between 115 to 130° C. which is preferably selected from the group of ethylene homopolymers such as HDPE and LDPE, and ethylene copolymers with at least one α-olefin; and optionally and preferably a fourth polymer such as a copolymer of ethylene with an alkyl acrylate or vinyl ester e.g. EBA or EVA, having a melting point between 80 to 105° C., preferably 90 to 100° C.

Beneficially, the present invention provides a polymeric blend having an improved combination of properties especially for forming a heat sealing layer comprising a blend of copolymers of ethylene and at least one α-olefin, said blend having a broadened heat seal range to enhance sealability without sacrificing puncture resistance, and other desirable properties.

Advantageously, the present invention produces films and bags less subject to seal failure relative to commercially available prior art films and may increase the impulse sealing temperature range.

DETAILED DESCRIPTION OF THE INVENTION

By the term "heat sealing layer" is meant a layer which is heat sealable to itself, i.e., be capable of fusion bonding by conventional indirect heating means which generate sufficient heat on at least one film contact surface for conduction to the contiguous film contact surface and formation of a bond interface therebetween without loss of the film integrity. Advantageously, the bond interface must be sufficiently thermally stable to prevent gas or liquid leakage therethrough when exposed to above or below ambient temperatures during processing of food within the tube when sealed at both ends, i.e., in bag form. Finally, the bond interface between contiguous inner layers must have sufficient physical strength to withstand the tension resulting from stretching or shrinking due to the food body sealed within the tube.

As used herein, "antioxidant" means an additive which retards oxidation, i.e., cross-linking, of that layer on irradiation. The heat sealing layer of the present invention may utilize antioxidants to inhibit crosslinking as further taught by Evert et al, U.S. Pat. No. 5,055,328 whose teachings and description is hereby incorporated by reference.

Various copolymers of ethylene and at least one alpha olefin are employed in the film of the invention. It is to be understood that use of the term "copolymer of ethylene" means that the copolymer is predominantly comprised of ethylene and that at least 50% by weight of the copolymer is derived from ethylene monomer units in forming the copolymer. Suitable alpha olefins include $C_3$ to $C_{10}$ alpha-olefins such as propene, butene-1, pentene-1, hexene-1, methylpentene-1, octene-1, decene-1 and combinations thereof. The invention contemplates use not only of bipolymers, but copolymers of multiple monomers such as terpolymers e.g. ethylene-butene-1-hexene-1 terpolymer.

The ethylene α-olefin copolymers used in the present invention may have various molecular weights, molecular weight distributions ($\overline{M}_w/\overline{M}_n$) and melt indices. Typically, the ethylene α-olefin copolymers used will have a melt index of less than 2 dg/min.(ASTM D-1238, condition E 190° C.), preferably 1.0 dg/min. or less.

The invention in all of its embodiments utilizes at least three different polymers having at least three different melting points. The term "melting point" means the peak melting temperature of the dominant melting phase as measured by Differential Scanning Calorimetry (DSC) with a 5° C./min. heating rate according to ASTM D-3418. At least two, and preferably all three, of the required polymers of the inventive blend are ethylene α-olefin copolymers. It is preferred that the three required polymers of the invention be present in an amount of at least 10% by weight each in the blend.

It is believed that useful physical properties, especially heat sealing range, are improved by selecting at least three polymers having melting points which are at least 5–10° C. apart to provide melting characteristics over a broad temperature range which leads to a broadened heat sealing range and enhanced properties. The first and third polymers have peak melting points which are at least 40° C. apart.

The first polymer of the inventive blend has a melting point between 55 to 75° C., and comprises an ethylene alpha olefin copolymer. Examples of suitable first polymers include copolymers of ethylene with at least one $C_3$–$C_{10}$ α-olefin, such as $C_2C_4$ and $C_2C_6$ copolymers. Exemplary suitable first polymers may have a density of 0.900 g/cm$^3$ or less, a melt index of about 1.5 dg/min. or less, and an $\overline{M}_w/\overline{M}_n$ of less than 3, preferably about 2. Preferred commercially available first copolymers include those sold under the trademark TAFMER A-0585X and EXACT 9036. TAFMER is a trademark of Mitsui Petrochemical Co., Tokyo, Japan. EXACT is a trademark of EXXON Chemical Co., Houston, Tex., for their ethylene α-olefin polymers produced using metallocene single-site catalysts. These resins typically have a low level of crystallinity; 10–15% is typical.

For the present invention, it is preferred that the first polymer of the heal sealing layer comprise a copolymer of ethylene having a melt index (M.I.) between about 0.2 and 2 (more preferably 0.2 to 0.7) dg/min. as measured by ASTM D-1238, at 190° C. under a total load of 2.16 Kg (condition E).

Regarding the suitable amount to be employed of the first polymer in the blend, the first polymer may comprise at least 10% and preferaby from about 20 to 35 weight % of the total weight of the required first, second and third polymer components, and preferably of the total polymer content of the polymer blend. Use of lesser amounts reduces shrinkability in those embodiments where heat shrinkability is desired and use of higher amount makes orientation more difficult and may increase extractable moieties to amounts which are undesirable for certain applications. When a preferred four component blend is used the first polymer will be present in an amount of from about 20 to 35% based upon the weight of the layer comprising the blend.

The second polymer of the inventive blend has a melting point of from 85 to 110° C. and comprises a copolymer of ethylene and at least one alpha olefin. Examples of suitable second copolymers include copolymers of ethylene and at least one $C_3$ to $C_{10}$ alpha olefin, such as $C_2C_4$, $C_2C_6$, $C_2C_8$ and $C_2C_4C_6$ copolymers. Exemplary suitable second polymers may have a density of at least about 0.900 g/cm$^3$ and higher, preferably from 0.900 to 0.915 g/cm$^3$; a melt index of 2 dg/min. or less, preferably less than 1.0 dg/min.; and a $\overline{M}_w/\overline{M}_n$ of less than 3.5 preferably about 2. Preferred second copolymers include AFFINITY PL 1840, PL 1880, and Exact 3032. AFFINITY is a trademark of Dow Chemical Co. of Midland, Mich., USA for its ethylene polymers produced using constrained geometry catalysts. Exact is a trademark of Exxon Chemical Co. of Houston, Tex., USA for their metallocene catalyst produced polymers.

For the present invention, it is preferred that the second polymer of the heal sealing layer comprise a copolymer of ethylene having a melt index (M.I.) between about 0.5 and 2.5 (more preferably 0.7 to 1.5) dg/min. as measured by ASTM D-1238, at 190° C. under a total load of 2.16 Kg (condition E).

Regarding the suitable amount to be employed of the second polymer in the blend, the second polymer may comprise at least 10% and preferaby from about 30 to 70 weight % of the total weight of the required first, second and third polymer components, and preferably of the total polymer content of the polymer blend. Use of lesser amounts reduces puncture resistance in those embodiments where puncture resistance is desired. When a preferred four component blend is used the second polymer will be present in an amount of from about 25 to 60%, preferably greater than 30%, based upon the total weight of the layer comprising the four polymer blend.

The third polymer of the inventive blend has a melting point of from 115 to 130° C. and comprises a thermoplastic polymer, preferably a copolymer of ethylene and at least one alpha olefin. Examples of suitable third polymers include copolymers of ethylene and at least one $C_3$ to $C_{10}$ alpha olefin, such as $C_2C_4$, $C_2C_6$, $C_2C_8$ and $C_2C_4C_6$ copolymers; LDPE; HDPE; and propylene copolymers. Exemplary suitable third polymers may have a density of at least about 0.900 g/cm$^3$ and higher, preferably from 0.900 to 0.930 g/cm$^3$, more preferably from 0.900 to 0.915 g/cm$^3$; a melt index of 2 dg/min. or less, preferably 1.0 dg/min. or less; and a $\overline{M}_w/\overline{M}_n$ of from about 2 to 12 or more, preferably greater than 3.5. Preferred third copolymers include ATTANE XU 61509.32. ATTANE is a trademark of Dow Chemical Co. of Midland, Mich., USA for its ethylene ULDPE(VLDPE) polymers.

For the present invention, it is preferred that the third polymer of the heal sealing layer comprise a polymer of ethylene having a melt index (M.I.) between about 0.2 and 2 (more preferably 0.2 to 0.7) dg/min. as measured by ASTM D-1238, at 190° C. under a total load of 2.16 Kg (condition E).

Regarding the suitable amount to be employed of the third polymer in the blend, the third polymer may comprise at least 10% and preferably from about 10 to 30 weight % of the total weight of the required first, second and third polymer components, and preferably of the total polymer content of the polymer blend. Use of lesser amounts reduces heat sealing properties in those embodiments where heat sealability is desired and use of higher amounts reduces puncture resistance and may decrease shrinkability undesirably for certain applications. When a preferred four component blend is used the third polymer will be present in an amount of from about 10 to 30% based upon the weight of the layer comprising the blend.

The optional and preferred fourth polymer of the inventive blend has a melting point of from 80 to 105° C., preferably 90 to 100° C. Suitable fourth polymers that may be employed in the heat sealing layer of the monolayer and multilayer films of the present invention include copolymers of ethylene and unsaturated esters having adhesive and/or heat sealing properties. Such copolymers are predominantly (>50 wt. %) ethylene. Suitable copolymers include ethylene vinyl esters and ethylene alkyl acrylates such as ethylene-vinyl acetate, ethylene-vinyl propionate, ethylene-methyl methacrylate, ethylene-ethyl methacrylate, ethylene-ethyl acrylate, and ethylene n-butyl acrylate. Preferred copolymers are ethylene-vinyl esters such as ethylene-vinyl acetate, ethylene-vinyl formate, ethylene-vinyl propionate, and ethylene-vinyl butylate. Especially preferred is ethylene-vinyl acetate (EVA). Many different EVA resins are commercially available having a wide range of vinyl acetate contents and melt flow indices.

Suitable vinyl ester or alkyl acrylate content of the preferred fourth polymer components used in the present invention include 4–28 (preferably 4–18) weight percent vinyl ester or alkyl acrylate based on the total copolymer weight.

For the present invention, it is preferred that the fourth polymer of the heal sealing layer comprise a copolymer of ethylene and a vinyl ester having a melt index (M.I.) between about 0.1 and 2 (more preferably 0.1 to 0.5) dg/min. as measured by ASTM D-1238, at 190° C. under a total load of 2.16 Kg (condition E). It is preferred that the fourth polymer when present comprise from about 10 to 30 weight % of the total weight of four polymer components, and preferably of the total polymer content of the polymer blend.

A most preferred EVA copolymer is that sold by the Exxon Chemical Company of Houston, Texas under the brand designation ESCORENE LD 701.06 with the following reported properties, a density of 0.93 g/cm$^3$, a vinyl acetate content of 10.5 wt. % and a melt index of about 0.19 dg/min., and a melting point of about 97° C.

It should be noted that the above reported melt indices are initial values for the pelletized resins as received by the manufacturer. Such as received pellet values are intended as used herein unless otherwise noted. Crosslinking, especially irradiative crosslinking, is known to increase the average molecular weight by formation of longer chains of molecules than originally present. Therefore, crosslinking will also reduce the melt index of a polymer from its initial value to a lower value since the melt index is not only a measure of viscosity but also an indirect measure of molecular weight. Also, the melt blended material will also have its own melt index which is not to be confused with that of the original copolymer components of the blend.

Advantageously, the present invention utilizes a polymeric blend material in the heat sealing layer which has a broad range of melt behavior and characteristics which are believed to enhance seal formation and strength while providing excellent puncture resistance. Beneficially, such polymeric material may provide a broad combination of desirable properties having important commercial advantages for production and use thermoplastic films, particularly biaxially stretched films having heat shrinkability properties at 90° C. Advantageously such films may have excellent puncture resistance, high shrinkability, high tensile strengths, good modulus, low haze, high gloss, excellent optical properties, and importantly a broad sealing range and good seal strength. Beneficially combinations of these desirable attributes are present in various embodiments of the invention. The blend has a sufficient film strength to withstand orientation (especially a tubular double-bubble type biaxial orientation process). The blend also resists "burn through" during heat sealing operations and produces strong fusion bonds as described below. Such polymer blends of the invention provide sufficient polymeric material having chain lengths suitable for diffusion and entanglement between adjacent layers during heat sealing operations to form strong integral fusion bonds.

It will be appreciated by those skilled in the art that materials of broad molecular weight or materials which are polymodal in molecular weight distribution are contemplated, as are blends of materials which have very narrow molecular weight distributions.

An advantage of the present invention is that use of the presently disclosed blends facilitates a broad heat sealing range for irradiated films.

Upon exposure to irradiation sufficient to cause cross-linking, heat sealable layers generally tend to diminish their heat sealing ability. However, an antioxidant may be added to the heat sealable inner layer of the tubular article to inhibit cross-linking within the polymer, thereby reducing the adverse effects of over-irradiation upon the heat sealing properties. Addition of an antioxidant further allows the irradiation dosage to be sufficiently high to allow other layers of the multilayer film to retain the beneficial effects of irradiation. Beneficially, films of the present invention may be crosslinked by use of chemical agents or by irradiation, preferably at a level between 1 and 10 Mrad, more preferably 2–6 Mrad.

The heat sealing layer of the present invention will comprise a blend of at least three different polymers, at least two of which are copolymers of ethylene and at least one α-olefin, and optionally and preferably a fourth polymer which preferably is a copolymer ethylene and at least one unsaturated ester.

As generally recognized in the art, resin properties may be further modified by blending in additional resins or additives such as colorants, processing aids, antiblock agents and slip agents, etc. and it is contemplated that the specific polymer blends as described above may be further blended with resins such as very low density polyethylene (VLDPE), linear low density polyethylene (LLDPE), low density polyethylene (LDPE), high density polyethylene (HDPE), ionomers, polypropylene, ethylene acrylates or esters; or may be formed into multilayer films with one or more additional layers of such resins or blends thereof.

The resins and others may be mixed by well known methods using commercially available tumblers, mixers or blenders. Also, if desired, well known additives such as processing aids, slip agents, antiblocking agents, pigments, etc., and mixtures thereof may be incorporated into the film into any or all layers.

Advantageously, in one embodiment of the present invention a blend of a first polymer having a melting point between 55 to 75° C. comprising a copolymer of ethylene and at least one α-olefin; a second polymer having a melting point between 85 to 110° C. comprising a copolymer of ethylene and at least one α-olefin; and a third polymer having a melting point between 115 to 130° C. comprising a thermoplastic polymer; and the blend may otherwise be: i) free from EVA; ii) have less than 15% by wt. EVA; iii) have greater than 25% EVA; or iv) have from 15% to 25% EVA, based upon the total weight of the blend layer.

In a preferred process for making films of the present invention, the resins and any additives are introduced to an extruder (generally one extruder per layer) where the resins are melt plastified by heating and then transferred to an extrusion (or coextrusion) die for formation into a tube. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other process parameters chosen. For example, according to the present invention, in extrusion or coextrusion of the polymer blends of the invention, barrel and die temperatures may range between about 145° C. and 185° C. However, variations are expected which may depend upon such factors as variation of polymer resin selection, use of other resins e.g. in the blend or in separate layers in a multilayer film, the manufacturing process used, and particular equipment and other process parameters utilized. Actual process parameters including process temperatures are expected to be set by one skilled in the art without undue experimentation in view of the present disclosure.

Blends of the present invention may be manufactured into various useful articles e.g. cast films using e.g. a slot die, or conventional blown films where a tubular film is produced directly from the die melt, molded, thermoformed, blow molded sheets, rigid solid, hollow or foamed bodies may also be produced. In a preferred embodiment, extrusion by a trapped bubble or double bubble process of the type described in U.S. Pat. No. 3,456,044 is used. In a preferred process for making an oriented or heat shrinkable film, a primary tube comprising the inventive plastic blend is extruded, and after leaving the die is inflated by admission of air, cooled, collapsed, and then preferably oriented by reinflating to form a secondary bubble with reheating to the film's orientation (draw) temperature range. Machine direction (M.D.) orientation is produced by pulling or drawing the film tube e.g. by utilizing a pair of rollers traveling at different speeds and transverse direction (T.D.) orientation is obtained by radial bubble expansion. The oriented film is set by rapid cooling. Suitable machine direction and transverse direction stretch ratios are from about 3:1 to about 5:1 with a ratio of about 4:1 preferred.

Films of the present invention may be monolayer or multilayer films preferably of 10 mils or less. Multilayer films have the following preferred layer thicknesses. The thickness of the heat sealable inner thermoplastic first layer is typically between about 0.5 and about 2.0 mils. Thinner layers may perform the aforedescribed functions, particularly in in structures of 5 or more layers. Thicker layers may not appreciably improve processability of the film and may reduce total film performance. Accordingly, they would be uneconomical.

The barrier layer thickness is preferably between about 0.1 and about 0.5 mils. Thinner barrier layers may not perform the intended functions and thicker layers do not appreciably improve performance.

In the barrier layer embodiment of this invention the outer thermoplastic layer of the enclosing multilayer film is on the opposite side of the core layer from the inner layer, and in direct contact with the environment. In a preferred three layer embodiment of the invention this outer layer is directly adhered to the core layer. Since it is seen by the use/consumer, it must enhance optical properties of the film. Also, it must withstand contact with sharp objects so is termed the abuse layer and provides abrasion resistance.

The outer layer is preferably formed of a blend of ethylene vinyl acetate as at least the major constituent, more preferably at 50% weight percent EVA and most preferably at least 70 weight percent EVA. Also, the outer layer preferably has between about 3% and about 18% vinyl acetate content to provide good shrinkability.

Alternatively, the outer layer may be formed of other thermoplastic materials as for example polyamide, styrenic copolymers e.g. styrene-butadiene copolymer, polypropylene, ethylene-propylene copolymer, ionomer, or an alpha olefin polymer and in particular a member of the polyethylene family such as linear low density polyethylene (LLDPE), very low density polyethylene (VLDPE and ULDPE), HDPE, LDPE, an ethylene vinyl ester copolymer or an ethylene alkyl acrylate copolymer or various blends of two or more of these materials.

The thermoplastic outer layer thickness is preferably between about 0.5 and 1.0 mils. Thinner layers may be less effective in performing the abuse resistance function.

Unless otherwise noted, the following physical properties are used to describe the present invention, films and seals and are measured by either the test procedures described below or tests similar to the following methods.
Average Gauge: ASTM D-2103
Tensile Strength: ASTM D-882, method A
1% Secant Modulus: ASTM D-882, method A
Percent Elongation: ASTM D-882, method A
Molecular Weight Distribution: Gel permeation chromatography
Gloss: ASTM D-2457, 45° Angle
Haze: ASTM D-1003-52
Melt Index: ASTM D-1238, Condition E(190° C.)
Melting Point: ASTM D-3418, DSC with 5° C./min. heating rate.
Vicat Softening Point: ASTM D-1525-82

All ASTM test methods noted herein are incorporated by reference into this disclosure.

DYNAMIC PUNCTURE RESISTANCE

The dynamic puncture resistance procedure is used to compare films for their resistance to bone puncture. It measures the energy required to puncture a test sample with a sharp pyramidal metal point made to simulate a sharp bone end. A Dynamic Ball Burst Tester, Model No. 13-8, available from Testing Machines, Inc., Amityville, Long Island, N.Y., is used, and a modified tip is installed on the tester probe arm for use in this test procedure. The modified tip is constructed from a ⅜ inch (0.95 cm) diameter conical tip having a configuration of a right circular cone with the angle between the cone axis and an element of the conical surface at the vertex being about 65°. Three equally spaced and abutting planar surfaces are machined to a smooth finish on the cone surface to form a pyramidal shaped point. At least six test specimens approximately 4 inches (10 cm) square are prepared, a sample is placed in the sample holder, and the pendulum is released. The puncture energy reading is recorded. The test is repeated until at least 6 samples have been evaluated. The results are calculated in cm-kg per mil of film thickness and are averaged.

Shrinkage Values: Shrinkage values are defined to be values obtained by measuring unrestrained shrink of a 10 cm square sample immersed in water at 90° C. (or the indicated temperature if different) for five seconds. Four test specimens are cut from a given sample of the film to be tested. The specimens are cut into squares of 10 cm length in the machine direction by 10 cm. length in the transverse direction. Each specimen is completely immersed for 5 seconds in a 90° C. (or the indicated temperature if different) water bath. The specimen is then removed from the bath and the distance between the ends of the shrunken specimen is measured for both the M.D. and T.D. directions. The difference in the measured distance for the shrunken specimen and the original 10 cm. side is multiplied by ten to obtain the percent of shrinkage for the specimen in each direction. The shrinkage of four specimens is averaged for the M.D. shrinkage value of the given film sample, and the shrinkage for the four specimens is averaged for the TD shrinkage value. As used herein the term "heat shrinkable film at 90° C." means a film having an unrestrained shrinkage value of at least 10% in at least one direction. Impulse Seal Range:

The impulse sealing range test determines the acceptable voltage ranges for impulse sealing plastic films. A Sentinel Model 12-12AS laboratory sealer manufactured by Packaging Industries Group, Inc., Hyannis Mass., U.S.A. was used. This impulse sealer is equipped with a replacement sealing ribbon for a Multivac AG100 brand packaging machine. The ribbon is available from Koch Supplies of Kansas City, Mo. In this test, two four inch wide (T.D. direction) samples are cut from a tubular film. The impulse sealer is equipped with controls for coolant flow, impulse voltage and time, and seal bar pressure. These controls except for impulse voltage are set at the following conditions:

0.5 seconds impulse time (upper ribbon only)

2.2 seconds cooling time 50 psi (345 kPa) jaw pressure 0.3 gallon per minute (1 liter per minute) of cooling (about 75° F. (22° C.)) water flow One of the samples is folded in half for use in determining a minimum sealing voltage. This folding simulates folding which may inadvertently occur during conventional bag sealing operations. The folded sample which now has four sheets or portions of film (hereinafter referred to as "sheet portions") is placed into the sealer and by trial and error the minimum voltage to seal the bottom two sheet portions to each other was determined.

The maximum voltage is then determined for a sample having two sheet portions by placing it in the sealer and then activating the seal bar. The film sample is manually pulled with about 0.5 lbs. of force and the voltage which does not cause burn through or significant distortion of the seal is determined.

Following are examples and comparative examples given to illustrate the invention.

In all the following examples, unless otherwise indicated, the film compositions were produced generally utilizing the apparatus and method described in U.S. Pat. No. 3,456,044 (Pahlke) which describes a coextrusion type of double bubble method and in further accordance with the detailed description above. In the following examples, all layers were extruded (coextruded in the multilayer examples) as a primary tube which was cooled upon exiting the die e.g. by spraying with tap water. This primary tube was then reheated by radiant heaters with further heating to the draw temperature (also called the orientation temperature) for biaxial orientation accomplished by an air cushion which was itself heated by transverse flow through a heated porous tube concentrically positioned around the moving primary tube. Cooling was accomplished by means of a concentric air ring. All percentages are by weight unless indicated otherwise.

EXAMPLE 1

In Example 1, a biaxially stretched, heat shrinkable, monolayer film of the present invention was made and its physical properties tested.

Thermoplastic resins generally in pellet form were mixed together to form an inventive blend of: a first polymer comprising a copolymer predominantly of ethylene with butene-1 monomer and having a reported density of about 0.885 g/cm$^3$, a melt index of 0.5 dg/min., a melting point of 68° C. which is available under the trademark Tafmer A0585X from Mitsui Petrochemical Industries, Ltd. of Tokyo, Japan; a second polymer comprising ethylene-α-olefin copolymer sold by Dow Chemical Company of Midland, Mich., U.S.A. under the trademark Affinity PL 1840 which is reportedly a copolymer of ethylene and octene-1(9.5%) having a melt index of about 1.0 dg/min. and a density of about 0.908 g/cm$^3$, and a melting point of about 103–106° C.; a third polymer comprising ethylene-α-olefin copolymer of very low density polyethylene sold by Dow Chemical Company of Midland, Mich., U.S.A. under the trademark Attane XU 61509.32 which is a copolymer of ethylene and octene-1 reportedly having a melt index of about 0.5 dg/min and a density of about 0.912 g/cm$^3$, with a Vicat softening point of 95° C. and a melting point of about 122° C.; and a fourth polymer comprising a copolymer of ethylene and vinyl acetate(EVA) available from Exxon Chemical Company of Houston Tex., U.S.A. under the trademark Escorene LD 701.06 and having the following reported properties: 10.5% vinyl acetate content, 0.93 g/cm$^3$ density, 0.19 dg/min. melt index, and a melting point of about 97° C.; 4.0% by weight of a slip processing aid sold under the trademark Ampacet 500301 by Ampacet Corp. of Tarrytown, N.Y., U.S.A.; and 2.0% by weight of a slip processing aid sold under the trademark Ampacet 100510 by Ampacet Corp. of Tarrytown, N.Y., U.S.A.

The blended resins were melt plastified in an extruder and a monolayer thermoplastic tube was extruded. The extruder barrel and extrusion die temperature profile was set at about 335° F. (168° C.) to about 360° F. (182° C.). The extruded primary plastic tube was then cooled, reheated, biaxially stretched, and cooled according to a double bubble process and the resultant biaxially stretched film wound on a reel. The machine direction (M.D.) draw or orientation ratio was about 4.9:1 and the transverse direction (T.D.) bubble or orientation ratio was about 4.2:1. The draw point or orientation temperature is below the melting point for each layer to be oriented and above that layer's Vicat softening point. The draw point temperature of the film of example 1 is believed to have been about 160 to 175° F. (71–79° C.). Draw point temperature, bubble cooling rates and orientation ratios are generally adjusted to maximize bubble stability with use of higher throughput rates and lower draw point temperatures believed to provide films having higher puncture resistance relative to use of lower throughputs or higher orientation temperatures.

The average gauge was measured to be about 2.25 mil (57 microns). Haze and 45° gloss were measured and are reported as 3.4% and 86 Hunter Units(HU). The Heat shrinkability if the fresh film was determined to be 46% in the machine direction (M.D.) and 54% in the transverse direction (T.D.) at 90° C.

Those skilled in the art of manufacturing biaxially oriented films know of different and various processes of such manufacture and the present inventive films include biaxially oriented or biaxially stretched films regardless of the method used for their production as well as uniaxially oriented and unoriented films including slot cast and hot blown films.

The above film sample is also usefully crosslinked by irradiation e.g. at a level of 2–6 megarads (Mrad) after biaxial stretching (which irradiative process is hereinafter referred to as post-irradiation), in the manner generally described in Lustig et al, U.S. Pat. No. 4,737,391 which is hereby incorporated by reference.

EXAMPLES 2–3

In Example 2, a biaxially stretched, heat shrinkable, coextruded, multilayer film of the present invention was made and its physical properties tested. Example 3 is a comparative example of a similar commercially acceptable multilayer film having a similar structure except that the heat sealing layer comprises the blend of the invention.

Examples 2–3 are three layer films. One extruder was used for each layer. Each extruder was connected to an annular coextrusion die from which heat plastified resins were coextruded forming a primary tube having a first inner layer, a second core layer and a third outer layer. The first and third layers being directly attached to opposing sides of the second core layer. The first/second/third layer ratio was about 62:10:28.

In Examples 2–3, for each layer, the resin mixture was fed from a hopper into an attached single screw extruder where the mixture was heat plastified and extruded through a three layer coextrusion die into a primary tube. The extruder barrel temperatures for the second (core) layer was between about 255–285° F. (124–141° C.); for the first (inner) layer was about 300–330° F. (149–166° C.); and for the third (outer) layer was about 300–340° F. (149–171° C.). The extrusion die had an annular exit opening of 3½ inch diameter with a 0.040 inch gap (8.89 cm×0.102 cm). The coextrusion die temperature profile was set from about 320° F. to 335° F. (160–168° C.). The extruded multilayer primary tube was cooled by spraying with cold tap water (about 7–14° C.).

The cooled primary tube was flattened by passage through a pair of nip rollers. In Examples 2–3, a flattened tube of about 3$^{15}$⁄$_{16}$ to 3⅞ inches (9.8 to 10 cm) flatwidth was produced. The cooled flattened primary tube was reheated, biaxially stretched, and cooled.

The cooled film was flattened and the biaxially stretched and biaxially oriented film was wound on a reel. The machine direction (M.D.) draw or orientation ratio was about 4.8:1 to 4.9:1 and the transverse direction (T.D.) bubble or orientation ratio was about 4.6:1 to 4.7:1 for all the films. The draw point or orientation temperature was below the predominant melting point for each layer oriented and above that layer's predominant glass transition point and is believed to be about 178° F. (81° C.) for Example 2 and about 185° F. (85° C.) for Example 3. Draw point temperature, bubble heating and cooling rates and orientation ratios are generally adjusted to maximize bubble stability and throughput for the desired amount of stretching or orientation. The resultant films of Examples 2–3 having an average gauge of 2.5 to 2.25 were biaxially oriented and had an excellent appearance.

For Example 2, the first layer comprised an inventive blend of: about 24 wt. % of a first polymer comprising a copolymer predominantly of ethylene with butene-1 monomer and having a reported density of about 0.885 g/cm$^3$, a melt index of 0.5 dg/min., a melting point of 68° C. which is available under the trademark Tafmer A0585X from Mitsui Petrochemical Industries, Ltd. of Tokyo, Japan; about 29.1 wt. % of a second polymer comprising ethylene-α-olefin copolymer sold by Dow Chemical Company of Midland, Mich., U.S.A. under the trademark Affinity PL 1840 which is reportedly a copolymer of ethylene and octene-1(9.5%) having a melt index of about 1.0 dg/min., a density of about 0.908 g/cm$^3$, and a melting point of about 103–106° C.; about 19.2 wt. % of a third polymer comprising ethylene-α-olefin copolymer of very low density polyethylene sold by Dow Chemical Company of Midland, Mich., U.S.A. under the trademark Attane XU 61509.32 which is a copolymer of ethylene and octene-1 reportedly having a melt index of about 0.5 dg/min and a density of about 0.912 g/cm$^3$, with a Vicat softening point of 95° C. and a melting point of about 122° C.; and about 19.3 wt. % of a fourth polymer comprising a copolymer of ethylene and vinyl acetate (EVA) available from Exxon Chemical Company of Houston Tex., U.S.A. under the trademark Escorene LD 701.06 and having the following reported properties: 10.5-vinyl acetate content, 0.93 g/cm$^3$ density, 0.19 dg/min. melt index, and a melting point of about 97° C.; 4.0% by weight of a processing aid sold under the trademark Ampacet 500301 by Ampacet Corp. of Tarrytown, N.Y., U.S.A.; and 4.4% by weight of a processing aid sold under the trademark Ampacet 100031 by Ampacet Corp. of Tarrytown, N.Y., U.S.A.

The heat sealing layer was the first layer of the multilayer film and the inner layer of the film tube. For Comparative Example 3, the heat sealing layer comprised a blend of about 69.1 wt. % of an ethylene octene-1 copolymer sold by Nova Chemicals Ltd. of Calgary, Alberta, Canada under the trademark Novacor D032-07 which is a $C_2C_8$ copolymer reportedly having a density of about 0.912 g/cm$^3$, a melt index of about 1.0 dg/min., a melting point of about 122° C.; about 22.5 wt. % of the above noted LD 701.06 EVA; about 4.4 wt. % of the above noted Ampacet 100031 processing aid; and about 4 wt. % of the above noted Ampacet 500301 processing aid.

For Examples 2–3, each core layer comprised a 3:1 blend of commercially available vinylidene chloride-methylacrylate copolymer and vinylidene chloride-vinyl chloride copolymer.

For Example 2, the third (outer) layer comprised: about 47 wt. % of a commercially available ethylene-α-olefin copolymer sold by Dow Chemical Company of Midland, Mich., U.S.A. under the trademark Affinity PL 1840 which is reportedly a copolymer of ethylene and octene-1 having a melt index of about 0.5 dg/min and a density of about 0.908 g/cm$^3$ and a melting point of about 103–106° C.; about 24.3% of a copolymer of ethylene and vinyl acetate (EVA) available from Exxon Chemical Company of Houston, Tex., U.S.A. under the trademark Escorene LD 701.06 having the following reported properties: 10.5% vinyl acetate content; 0.93 g/cm$^3$ density; 0.19 dg/min. melt index; and a melting point of about 97° C.; about 24.3% of a copolymer of ethylene with butene-1 monomer and having a reported density of about 0.885 g/cm$^3$ a melt index of 0.5 dg/min., a melting point of 68° C. which is available under the trademark Tafmer A0585X from Mitsui Petrochemical Industries, Ltd. of Tokyo, Japan; and 4.4% by weight of a slip processing aid sold under the trademark Ampacet 100031 by Ampacet Corp. of Tarrytown, N.Y., U.S.A.

For example 3, the third layer comprised about 80.6 wt. % of the above noted Novacor D032–07 copolymer; about 15 wt. % of the above noted EVA; and about 4.4 wt. % of the above noted Ampacet 100031 processing aid.

The multilayer films of Examples 2–3 were irradiated after orientation by electron beam according to methods well known in the art to a level of 5.3 and 4.5 Mrad, respectively.

Physical properties of the irradiated multilayer films were tested and are reported in Table 1.

TABLE 1

| Ex. No. | AVG. GAUGE mil ($\mu$) | TENSILE STRENGTH at RT x $10^3$ psi (Mpa) MD/TD | ELONGATION AT BREAK at RT % MD/TD | 1% SECANT MODULUS MPa MD/TD | DYNAMIC PUNCTURE cmKg/$\mu$ | SHRINK at 90° C. % MD/TD | HAZE % | GLOSS at 45° Angle | IMPULSE SEAL RANGE min./max. (volts) |
|---|---|---|---|---|---|---|---|---|---|
| 2 | 2.5† (63.5) | 13.2/15.0 (91/103) | 218/187 | 213/225 | 0.13 | 42/49 | 5.5 | 77 | 32–50 |
| 3* | 2.25 (57.2) | 13.5/14.7 (93/101) | 186/179 | ND | 0.08 | 23/36 | ND | ND | 34–48 |
| 4 | 2.5† (63.5) | 14.6/14.4 (101/99) | 184/176 | ND | 0.09 | 40/46 | 5.9 | 81 | 34–50 |
| 5 | 2.59 (65.8) | 12.6/12.1 (87/83) | 191/196 | ND | 0.09 | 40/47 | 6.1 | 76 | 34/49 |
| 6 | 2.57 (65.3) | 14.1/13.5 (97/93) | 184/178 | ND | 0.09 | 40/46 | 6.3 | 76 | 34/49 |
| 7 | 2.58 (65.5) | 15.0/13.9 (103/96) | 172/179 | ND | 0.11 | 47/52 | 5.8 | 75 | 35/50 |

ND = Not Determined
RT = Room Temperature (20–23° C.)
* = Typical Values
† = Nominal Thickness Referring now to Table 1, Comparative Example 3 presents physical property values which are acceptable for food packaging film which are commercially useful for packaging processed meats. Example 2 of the present invention has comparable or better values for shrink, puncture resistance and impulse seal range relative to Comparative Example 3 for multilayer films of substantially the same gauge thickness. Multilayer films of the present invention demonstrate excellent tensile strengths, elongation at break values and 1% secant modulus values as well as very good haze and gloss properties. The elongation at break of the inventive film is also good. Film of the invention processed well.

The films of the present invention have desirable sealing properties. The impulse seal range test demonstrates broader sealing range than that of the control. 1 and 2 volt differences in sealing range values are significant and the 2 volt extension on both ends of the range is believed to translate into broader ranges for many commercially available sealers other than the Sentinel.

In controlled field tests, bags formed from the films of Examples 2 and 3 were laminated with 7 mil (178 micron) thick films and used to package shortloins and evacuated and sealed with commercial impulse sealing machines. During the sealing operation, air was evacuated from the shortloin containing bag and the evacuated bag was temporarily sealed by mechanically clamping near the mouth end and then spaced inwardly from the clamp the bag was impulse sealed. The excess film was severed from the sealed bag by a knife cutting across the mouth end between the impulse seal and the clamp. The inventive film tested out with no burn through leakers, no bone puncture failures and only a 16% failure at load-off for shortloins held overnight compared to a 27% failure for films similar to comparative example 3 and 15% for another commercially successful film for this application.

The above tests for leakers, and impulse seal range demonstrate films having a heat sealing layer can be made according to the present invention to produce better seals. These seals are stronger, and less subject to failure due to variations in heat sealing process parameters and equipment and have a desirable combination of high shrinkability at low temperatures e.g. 90° C., high puncture resistance and a broad sealing range.

EXAMPLES 4–7

For all the Examples 4–7, biaxially stretched, heat shrinkable 3-layer coextruded films similar to the inventive film of example 2 were made under similar conditions. The layer ratio was the same as for Example two and the formulations were the same except as follows. Example 4 had the same formulation as Example 2. In Example 5, Affinity™ PL 1880 from Dow Chemical Co. was substituted for PL 1840 copolymer in both the first and third layers. PL 1880 is a copolymer of ethylene and octene-1 having the following reported properties; density of 0.902 g/cm³; 1 M.I.; a melting point of 100° C.; a Vsp of 83° C.; and a $\overline{M}_w/\overline{M}_n$<3.0. In Example 6, Affinity™ 58000.02 from Dow Chemical Co. was substituted for PL 1840 copolymer in both the first and third layers. 58000.02 is a copolymer of ethylene and octene-1 having the following reported properties; density of 0.908 g/cm³; M.I. of 0.9; a melting point of 105° C.; and a $\overline{M}_w/\overline{M}_n$<3.0. In Example 7, Exact™ 3032 from Exxon Chemical Co. was substituted for PL 1840 copolymer in both the first and third layers. Exact™ 3032 is a terpolymer of ethylene, hexene-1, and butene-1 having the following reported properties; density of 0.902 g/cm³; M.I. of 1.2; a melting point of 94° C.; a Vsp of 79° C.; and a $\overline{M}_w/\overline{M}_n$<2.5. All of the films of examples 4–7 were irradiated to a level of about 5 Mrad according to methods well known in the art.

Physical properties of the irradiated multilayer films were tested and are reported in Table 1.

Referring now to Table 1, Examples 4–7 all present physical property values which are acceptable for food packaging films which are commercially useful for packaging articles e.g. fresh or processed meats.

Examples 2–7 are three layered films. However, multilayered films of two or four or more layers are contemplated by the present invention. The inventive multilayer films may include tie or adhesive layers as well as layers to add or modify various properties of the desired film such as heat sealability, toughness, abrasion resistance, tear resistance, puncture resistance, optical properties, gas or water barrier properties, shrinkability, and printability. These layers may be formed by any suitable method including coextrusion, extrusion coating, and lamination.

In another embodiment of the invention, the three required blend components are not strickly in a single blend but may be placed into two adjacent layers e.g. by coextrusion, coating lamination, or lamination. In this embodiment of the invention a first heat sealing layer comprises a polymer such as the above mentioned third polymer having a melting point of from about 115 to 130°

C. Optionally this first layer may further comprise either or both of the aforementioned first or fourth polymers having respective melting point of 55 to 75° C., and 80 to 105° C. (preferably 90 to 100° C.). Most preferably this first layer will comprise a combination of the first, third and fourth polymers specified above, especially two copolymers of ethylene and at least one alpha olefin and one copolymer of ethylene and a vinyl ester or alkyl acrylate(most desirably EVA). In this alternative embodiment, in direct contact with the first layer is a second layer which comprises a blend of the first and second polymers described above i.e. a first polymer having a melting point of 55 to 75° C. in combination with a second polymer having a melting point of 85 to 110° C. This inventive two layer film may be usefully employed as a blown film, cast film or may be axially stretced in one or two directions to produce a heat shrinkable film of two layers it may also through lamination processes or coextrusion be part of a multilayer film structure having 3 or more layers but may find special utility as a 5 layer film or 7 or greater layer film. An example of a preferred structure includes a first heat sealing layer having a blend of EVA and Attane XU 61509.32; a second layer comprising a blend of Exact 3033 (preferably 60%) and Tafmer A-0585X (preferably 40%); a third core layer comprising a gas barrier resin such as EVOH or saran; a fourth layer comprising the same blend as the second layer; and a fifth layer comprising a blend similar to the first layer. A suitable layer ratio would be 10%/50%/6%/24%/10%. In an alternative preferred embodiment, the first and fifth layers would comprise a blend if the first, third, and fourth polymers i.e. a plastomer (55–75° C. m.p.)+a polyethylene homo- or copolymer (115–130° C. m.p.)+ an EVA (90–100° C. m.p.).

In another aspect of the invention, one or more alternative layers having gas barrier properties may be incorporated into a multilayer film as either an intermediate or surface layer or both. For example, ethylene vinyl alcohol copolymer (EVOH), vinylidene chloride-methylacrylate copolymer, nylon such as nylon 6 or amorphous nylon, vinylidene chloride-vinyl chloride copolymer, acrylonitriles were other materials having oxygen barrier properties may be used in one or more layers such as the core layer. Blends of resins having gas barrier properties may also be used e.g. a blend of nylon with EVOH. Typical gas barrier films will have a gas barrier layer having an oxygen transmission of less than 15 cc/100 in² for 24 hrs. at 1 atm.

While this invention has been described with reference to certain specific embodiments, it will be recognized by those skilled in the art that many variations are possible without departing from the scope and spirit of the invention.

What is claimed is:

1. A flexible film having at least one layer comprising a blend of at least three polymers comprising:
   a first polymer having a melting point between 55 to 75° C. comprising a copolymer of ethylene and at least one α-olefin;
   a second polymer having a melting point between 85 to 110° C. comprising a copolymer of ethylene and at least one α-olefin; and
   a third polymer having a melting point between 115 to 130° C. comprising an unmodified thermoplastic polymer selected from the group of a copolymer of ethylene and at least one α-olefin, LDPE, HDPE, and propylene copolymers.

2. A film, as defined in claim 1, wherein said third polymer comprises a copolymer of ethylene and at least one α-olefin.

3. A film, as defined in claim 1, further comprising a fourth polymer having a melting point between 80 to 105° C.

4. A film, as defined in claim 1, further comprising a fourth polymer having a melting point between 90 to 100° C.

5. A film, as defined in claim 3, wherein said fourth polymer comprises a copolymer of ethylene and a vinyl ester or alkyl acrylate.

6. A film, as defined in claim 1, further comprising at least one other thermoplastic layer.

7. A film, as defined in claim 1, wherein said blend containing layer has been irradiatively crosslinked.

8. A film, as defined in claim 1, wherein said layer is the innermost heat sealable layer of a tube formed of said film.

9. A film, as defined in claim 1, wherein said film is fabricated into bags.

10. A film, as defined in claim 6, wherein said additional layer comprises a gas barrier layer having an oxygen transmission of less than 15 cc/100 in² for 24 hrs. at 1 atm.

11. A film, as defined in claim 6, wherein said film is a tubular multilayer film formed by coextrusion or coating lamination and said blend comprises a heat sealing layer which is the innermost layer of said tube.

12. A film, as defined in claim 1, wherein said film is biaxially stretched.

13. A film, as defined in claim 1, wherein said film is heat shrinkable at 90° C.

14. A film, as defined in claim 13, wherein said film has at least 30% shrink in at least one direction at 90° C.

15. A film, as defined in claim 1, wherein said blend comprises at least 50 percent by weight of a heat sealing layer.

16. A biaxially stretched, heat shrinkable film having at least three layers comprising:
    a first layer wherein said first layer is a heat sealable surface layer comprising a blend of at least four polymers including a first polymer having a melting point between 55 to 75° C. comprising a copolymer of ethylene and at least one α-olefin; a second polymer having a melting point between 85 to 110° C. comprising a copolymer of ethylene and at least one α-olefin; a third polymer having a melting point between 115 to 130° C. comprising an unmodified thermoplastic polymer selected from the group of a copolymer of ethylene and at least one α-olefin, LDPE, HDPE, and propylene polymers; and a fourth polymer having a melting point between 80 to 105° C.;
    a third layer comprising at least 50 percent by weight of copolymer of ethylene with at least one alpha-olefin or at least one vinyl ester or blends thereof; and
    a second layer between said first and third layers, said second layer comprising a vinylidene chloride copolymer, a nylon or a copolymer of ethylene with a vinyl alcohol.

17. A thermoplastic film of at least two layers comprising, a first heat sealable surface layer comprising an unmodified thermoplastic polymer (A) having a melting point between 115 to 130° C. and a polymer (B) having a melting point between 80 to 105° C., and a second layer in direct contact with said first layer without any interposed thermoplastic film layer, said second layer comprising a polymer (C) having a melting point between 55 to 75° C. comprising a copolymer of ethylene and at least one α-olefin and a polymer (D) having a melting point between 85 to 110° C. comprising a copolymer of ethylene and at least one α-olefin.

* * * * *